United States Patent [19]
Hampton et al.

[11] Patent Number: 5,812,270
[45] Date of Patent: Sep. 22, 1998

[54] WINDOW CONTAMINATION DETECTOR

[75] Inventors: D. Scott Hampton, Mundelein; Eugene F. Kalley, St. Charles; Sam Paris, Chicago; David W. Jenkins, Aurora, all of Ill.

[73] Assignee: Ircon, Inc., Niles, Ill.

[21] Appl. No.: 932,314

[22] Filed: Sep. 17, 1997

[51] Int. Cl.⁶ ............................................. G01B 11/00
[52] U.S. Cl. .......................... 356/394; 356/239; 356/237
[58] Field of Search .................................. 356/394, 239, 356/237

[56] References Cited

U.S. PATENT DOCUMENTS

| | | |
|---|---|---|
| 2,633,543 | 4/1953 | Howatt . |
| 2,756,353 | 7/1956 | Samsel . |
| 2,831,115 | 4/1958 | Hahnel . |
| 2,836,737 | 5/1958 | Crownover . |
| 3,056,093 | 9/1962 | Oestreicher . |
| 3,061,802 | 10/1962 | Westnent, Jr. . |
| 3,179,902 | 4/1965 | Bernfeld et al. . |
| 3,188,584 | 6/1965 | Awender et al. . |
| 3,536,910 | 10/1970 | Ormrod et al. . |
| 3,586,439 | 6/1971 | Treharne et al. . |
| 3,616,638 | 11/1971 | Bennett et al. . |
| 3,743,868 | 7/1973 | Kawada . |
| 3,925,668 | 12/1975 | Anderson et al. . |
| 3,926,524 | 12/1975 | Margulies et al. . |
| 3,949,247 | 4/1976 | Fenner et al. . |
| 3,952,196 | 4/1976 | Larsen . |
| 3,999,433 | 12/1976 | Taplin . |
| 4,198,123 | 4/1980 | Kremen . |
| 4,208,741 | 6/1980 | Brun . |
| 4,227,158 | 10/1980 | Schroeder et al. . |
| 4,233,512 | 11/1980 | Rupert . |
| 4,262,198 | 4/1981 | Hong et al. . |
| 4,405,234 | 9/1983 | Juaire . |
| 4,435,093 | 3/1984 | Krause et al. . |
| 4,485,305 | 11/1984 | Kuwano et al. . |
| 4,547,673 | 10/1985 | Larsen . |
| 4,556,293 | 12/1985 | Moeller et al. . |
| 4,610,541 | 9/1986 | Tanimoto et al. . |
| 4,631,406 | 12/1986 | Nakata . |
| 4,679,934 | 7/1987 | Ganguly et al. . |
| 4,756,599 | 7/1988 | Maeda et al. . |
| 4,783,599 | 11/1988 | Borden . |
| 4,789,992 | 12/1988 | Wickersheim et al. . |
| 4,790,324 | 12/1988 | O'Hara et al. . |
| 4,797,840 | 1/1989 | Fraden . |
| 4,804,273 | 2/1989 | Tondello et al. . |
| 4,806,761 | 2/1989 | Carson et al. . |
| 4,808,813 | 2/1989 | Champetier . |
| 4,815,841 | 3/1989 | Bickler et al. . |
| 4,826,316 | 5/1989 | Odum . |
| 4,850,697 | 7/1989 | Schoennauer et al. . |
| 4,862,030 | 8/1989 | Yokoyama et al. . |
| 4,874,251 | 10/1989 | Thomas et al. . |
| 4,918,305 | 4/1990 | Wlodarczyk et al. . |
| 4,919,505 | 4/1990 | Bartosiak et al. . |
| 4,922,309 | 5/1990 | Sekiwa et al. . |

(List continued on next page.)

FOREIGN PATENT DOCUMENTS

| | | |
|---|---|---|
| 0 262 825 A2 | 9/1987 | European Pat. Off. . |
| 3123607 A1 | 6/1980 | Germany . |
| 3607679 A1 | 3/1986 | Germany . |
| 2175686 | 12/1986 | United Kingdom . |
| 2185578 | 12/1986 | United Kingdom . |
| WO 96/29584 | 3/1996 | WIPO . |

*Primary Examiner*—Frank G. Font
*Assistant Examiner*—Reginald A. Ratliff
*Attorney, Agent, or Firm*—Wallenstein & Wagner, Ltd.

[57] ABSTRACT

A contamination detection apparatus is provided for measuring an amount of contamination on an optically transmitting element or pane. The optically transmitting element is capable of transmitting electromagnetic radiation. The contamination detection apparatus includes a contamination detection (CD) radiation source for providing a source intensity of radiation. The source intensity or radiation passes through the optically transmitting element at least one time. A reference detector is also provided for detecting the source intensity of radiation, and the reference detector has a reference output level that is representative of the source intensity.

31 Claims, 4 Drawing Sheets

U.S. PATENT DOCUMENTS

| | | |
|---|---|---|
| 4,968,112 | 11/1990 | Lovely et al. . |
| 5,011,296 | 4/1991 | Bartosiak et al. . |
| 5,060,890 | 10/1991 | Utterback et al. . |
| 5,096,301 | 3/1992 | Stanley . |
| 5,099,120 | 3/1992 | Turnbull . |
| 5,113,458 | 5/1992 | Taylor . |
| 5,115,211 | 5/1992 | Hara . |
| 5,180,363 | 1/1993 | Idemoto et al. . |
| 5,181,019 | 1/1993 | Gottlieb et al. . |
| 5,185,675 | 2/1993 | Banks . |
| 5,202,745 | 4/1993 | Sorin et al. . |
| 5,210,735 | 5/1993 | Hoshino et al. . |
| 5,220,833 | 6/1993 | Nakamura . |
| 5,221,146 | 6/1993 | Maruyama . |
| 5,225,793 | 7/1993 | Higashiyama et al. . |
| 5,233,258 | 8/1993 | Myoga et al. . |
| 5,235,235 | 8/1993 | Martin et al. . |
| 5,247,222 | 9/1993 | Engle . |
| 5,260,772 | 11/1993 | Pollak et al. . |
| 5,265,267 | 11/1993 | Martin et al. . |
| 5,274,345 | 12/1993 | Gau . |
| 5,281,887 | 1/1994 | Engle . |
| 5,281,899 | 1/1994 | Culp . |
| 5,293,039 | 3/1994 | Mongiols . |
| 5,302,921 | 4/1994 | Shigemori et al. . |
| 5,303,032 | 4/1994 | Uesu et al. . |
| 5,315,203 | 5/1994 | Bicos . |
| 5,317,380 | 5/1994 | Allemand . |
| 5,327,104 | 7/1994 | Kikushima . |
| 5,345,519 | 9/1994 | Lu . |
| 5,365,339 | 11/1994 | Nishiura et al. . |
| 5,381,493 | 1/1995 | Egalon et al. . |
| 5,391,001 | 2/1995 | Rupert et al. . |
| 5,653,537 | 8/1997 | Kurata et al. . |

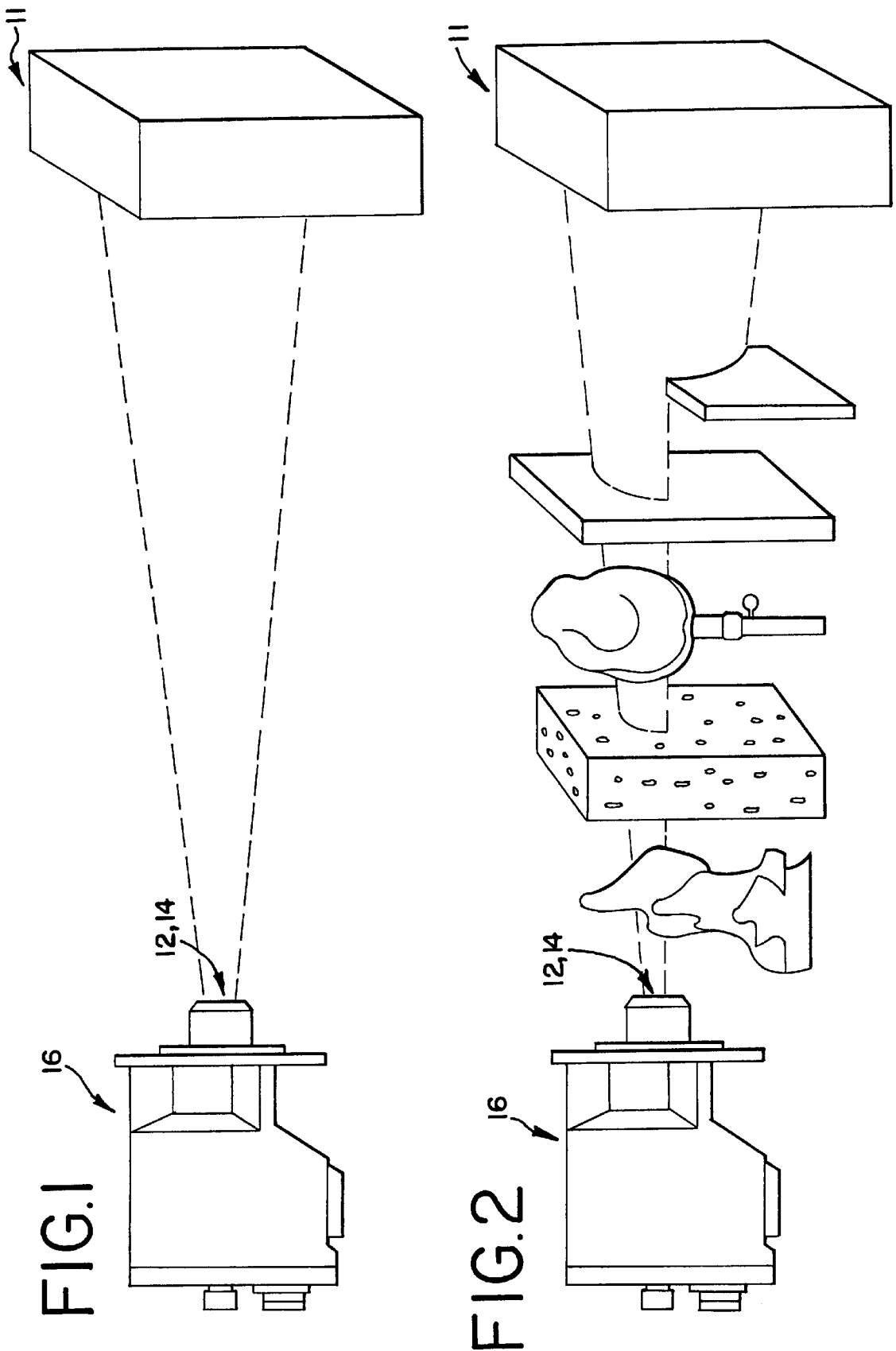

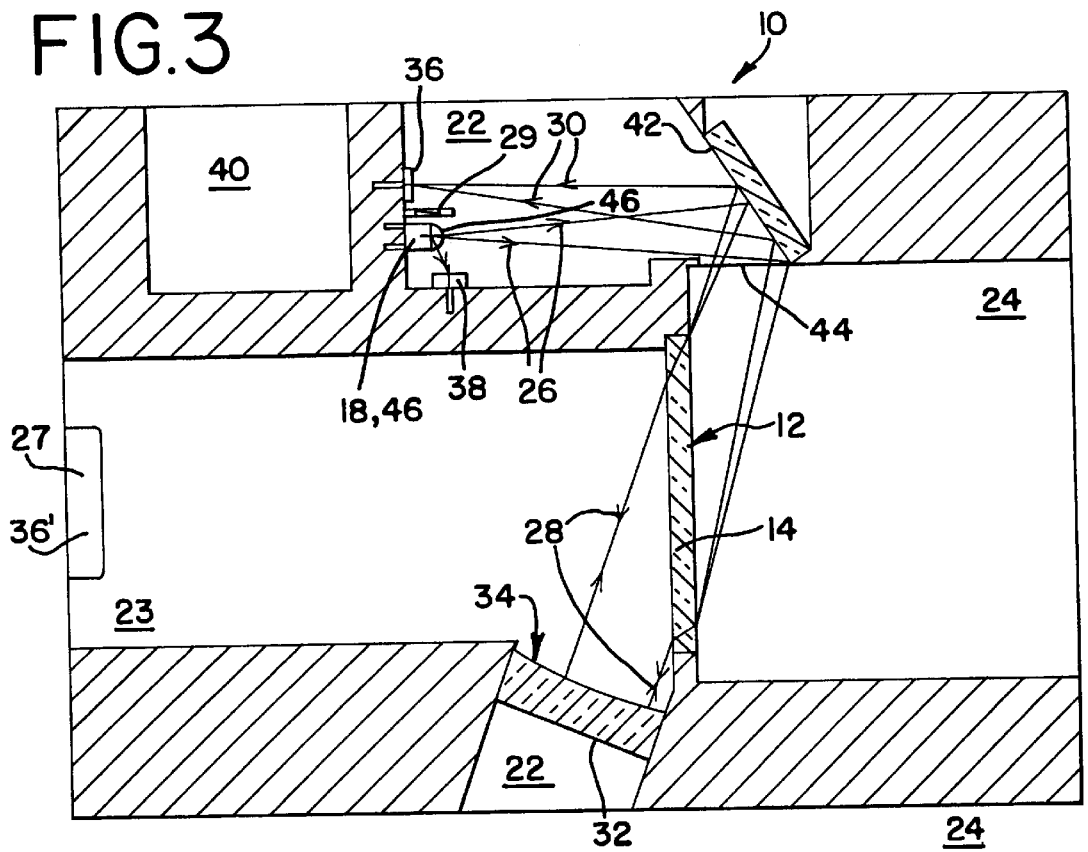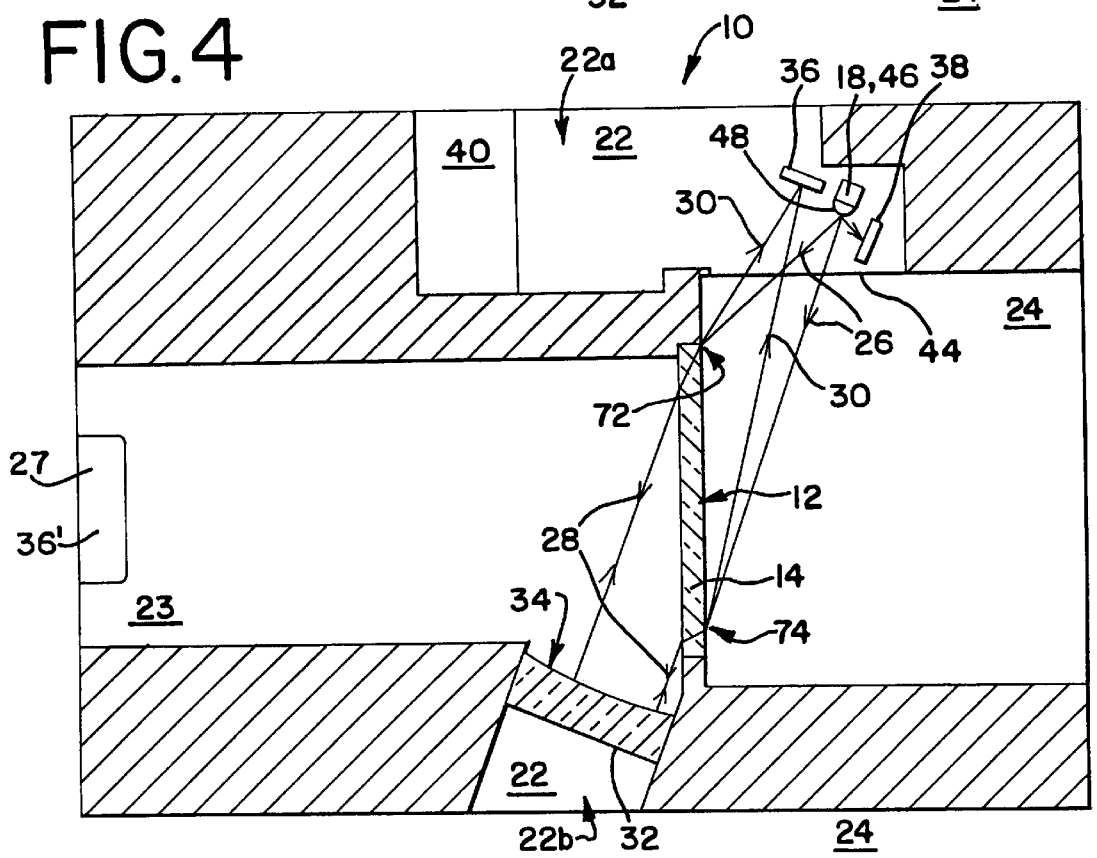

WINDOW CONTAMINATION DETECTOR

TECHNICAL FIELD

The present invention relates generally to a method and apparatus for detecting contamination on the surface of an optically transmitting element (a window pane, a lens, a pane of translucent material, or a pane of transparent material). More particularly, the present invention relates to a method and apparatus for detecting the amount of contamination that exists on a optically transmitting pane used within an electromagnetic radiation measuring device, such as a pyrometer, or other device.

BACKGROUND OF THE INVENTION

For optical measuring devices whose outputs are based on the absolute quantity of radiation (ultraviolet, visible, or infrared) collected by the instrument, contamination of the optics by dirt, mist, dust, or other contaminant can reduce the amount of light detected by the instrument, resulting in measurement error. One example is an infrared thermometer that measures the radiation within a narrow wavelength band coming from a heated material (target) in order to determine the temperature of the material. When the thermometer's optics become contaminated, the thermometer will erroneously indicate that the material being measured has cooled off. Even for instruments whose output is not determined by absolute collected radiation (multi-wavelength thermometers, polarimeters, etc.), contamination of the optical path can reduce the dynamic range and otherwise adversely influence the performance of the instrument.

Before knowing that corrective action should be taken, i.e., cleaning the optical surfaces, contaminants must be detected. One such detection apparatus is disclosed in U.S. Pat. No. 3,952,196 to Larsen, and assigned to Detector Electronics Corporation of Minneapolis, Minn. This reference discloses a device for determining that the optical surfaces, through which radiation must travel from a hazardous area of radiation to a radiation detector, are free from radiation absorbing material or contamination. The apparatus disclosed in this reference includes an ultraviolet source S, an ultraviolet detector D, a lens 18, and a reflective member 20. The reflective member 20 extends entirely across the lens 18. The source S is energized, and if the various surfaces permit outward transmission of radiation from the source S, this radiation will be directed back upon striking of a reflective surface, to the detector D. However, the reflective member 20 being extended across the lens 18 interferes with radiation passing into lens 18 from the exterior of the overall apparatus. In addition, this device does not monitor source S, and therefore will not be sensitive. For example, if the source S changes in intensity, because no monitoring of the source is performed, the change in intensity will be detected inaccurately as a change in contamination. Other problems arise from not monitoring the source S. In addition, this device does not cover a large fraction of the lens 18. Therefore, contamination may exist on the lens 18, but may not be detected due to the small area of coverage of the lens 18. Furthermore, this device does not concurrently measure the whether contamination exists on the lens 18 at the same time as radiation is being measured from a target.

Another detection apparatus is disclosed in UK Patent Application GB 2175686A, filed by Graviner of the United Kingdom. This reference discloses a fire or explosion detection arrangement. The arrangement includes a housing having first and second adjacent radiation-transmitting windows, a radiation sensor mounted within the housing for receiving radiation through the first window, a source of testing radiation mounted externally of the housing and energizable to generate testing radiation capable of passing through the second radiation transmitting window, but not through the first window, means for directing the radiation passing through the second window to the radiation sensor, and means for determining whether the level of obscuration of the second window lies above or below a predetermined level. However, as stated in this reference, the arrangement will only be effective as a test of the cleanliness of the window assembly 10 (first window) if it can be assumed that the state of cleanliness of the window 22 (second window) is a sufficient measure of the state of cleanliness of the window assembly 10. In addition, this device does not monitor the source, and therefore will not be sensitive. For example, if the source changes in intensity, because no monitoring of the source is performed, the change in intensity will be detected inaccurately as a change in contamination. Other problems arise from not monitoring the source. In addition, this device does not cover a large fraction of either window. Therefore, contamination may exist on the windows, but may not be detected due to the small area of coverage of only one of the windows. Furthermore, this device does not concurrently measure whether contamination exists on the windows at the same time as radiation is being measured from a target.

One additional detection apparatus is disclosed in U.S. Pat. No. 4,547,673 to Larsen et al., and assigned to Detector Electronics Corporation of Minneapolis, Minn. This reference discloses an apparatus for detecting flame or smoke. The apparatus includes a radiation detection tube used for window contamination detection within a housing having a window, a first internal radiation source used for window contamination detection which emits light over an optical path through the window and which light is reflected by a surface outside the housing but adjacent the window. A second radiation source used for smoke detection is included within the housing, but emits light over an optical path external to the housing. A reflective surface is positioned external to the housing and in front of the housing window so as to reflect light from the second radiation source back through the window and into the radiation detection tube. Specifically, light source 34a passes outwardly through the window, reflects against a mirrored surface 28b back toward window 14, and passes through window 14 into the inner volume of the housing to impinge upon a radiation detector 30. The radiation tube may also receive light from the first internal radiation source which may be used as a calibration base for the other internal light source of light as well as a self-checking feature for the cleanliness of the optical elements. However, since the radiation source is not directly monitored, a change in the intensity of the radiation source will be detected as a change in contamination, when there is no actual change in contamination. Furthermore, since the radiation source is not directly monitored, a change in the intensity of the radiation source will be detected as a change in the contamination, when there is no actual change in contamination. This reference also discloses that circuits may be devised for comparing the respective signals received by radiation detector 30 from light transmitted from light source 34 by way of comparison with light transmitted from light source 21. In this manner, light source 34 is used as a base signal or point of comparison for measuring the relative degradation of the light signals received from light source 21, which degradation would principally be caused by smoke obscuring the light transmission path from light source 21. However, the degradation could be due to light source 34, changing in intensity while light source 21 is unchanged. Therefore, it would not be correct to use light source 34 as a base signal for light source 21 because of the natural changes in the intensity of the light source 34 due to time and temperature.

The U.S. Pat. No. 4,547,673 patent also discloses that in the event the outer surface of window 14 becomes contaminated with dirt, vapors, or other opaque materials, radiation detector 10 will cease to function effectively. The contamination also affects the relative efficiency of transmission of light from both light sources 21 and 34, and may be detected by noting a reduction in signal strength received by radiation detector 30 from these sources. Similarly, if any of the mirrored surfaces become contaminated by dirt, dust or other materials, this contamination may be monitored by means of monitoring the signal strength received from radiation detector 30. A significant reduction in any or all of the signals received by radiation detector 30 may be utilized as a maintenance warning to be generated by the electrical circuits connected thereto. However, this method does not distinguish between light source 34 changing and the window contamination changing because light source 34 is not directly monitored. Furthermore, the use of two internal light sources increases manufacturing costs for the finished product of the U.S. Pat. No. 4,547,673 patent. In addition, by using an external mirrored/reflective surface in the arrangement disclosed in this reference, any contamination or other material which ends up on the mirrored/reflective surface cannot easily be cleaned. Furthermore, this reference does not disclose that any minimum region of the window is covered for contamination detection, nor is there any sensitivity equalization mentioned. In addition, this reference does not address the problems caused by background radiation. Also, this reference does not disclose any particular sensitivity, except for a threshold of a "significant" reduction in any or all of the signals received by radiation detector 30.

The present invention is provided to solve these and other problems.

SUMMARY OF THE INVENTION

The present invention is a contamination detection apparatus for precisely measuring an amount of contamination on an optically transmitting element or pane. The optically transmitting element is capable of transmitting electromagnetic radiation. The contamination detection apparatus includes a contamination detection (CD) radiation source for providing a source intensity of radiation. The source intensity or radiation passes through the optically transmitting element at least one time. A reference detector is also provided for directly detecting the source intensity of radiation, and the reference detector has a reference output level that is representative of the source intensity.

A measurement detector is further provided for detecting a final pass intensity of the radiation provided by the CD radiation source after the radiation provided by the CD radiation source has passed through the optically transmitting element. The measurement detector has a measurement output level that is representative of the final pass intensity. A comparator is also provided for comparing the measurement output level with the reference output level in order to detect the amount of contamination on the optically transmitting element. The comparator can take several forms, such as a microprocessor or other processing device.

In one specific embodiment of the present invention, the measurement detector is a target detector for detecting the electromagnetic radiation from a target, within an electromagnetic radiation measuring device. The electromagnetic radiation measuring device measures the intensity of electromagnetic radiation from the target, and the optically transmitting element transmits the electromagnetic radiation from the target to the target detector.

A further embodiment of the present invention is also a contamination detection apparatus for an electromagnetic radiation measuring device. A target detector is provided for detecting the electromagnetic radiation from the target, and the target detector has a target output level that is representative of the intensity of the electromagnetic radiation from the target. The contamination detection apparatus therein includes a contamination detection (CD) radiation source for providing a source intensity of radiation which passes through the optically transmitting element. A measurement detector is also provided for detecting a final pass intensity of the radiation provided by the CD radiation source after the radiation provided by the CD radiation source has passed through the optically transmitting element. The measurement detector has a measurement output level that is representative of the final pass intensity. A baffle is provided for preventing radiation provided by the CD radiation source from affecting the target detector. A comparator (microprocessor or other computing apparatus) is further provided for comparing the measurement output level with a reference level that represents the amount of radiation from the contamination detection (CD) radiation source, in order to determine an amount of contamination on the optically transmitting element. The contamination detection apparatus is capable of operating simultaneously with the measurement of the intensity of the electromagnetic radiation from the target.

In a further embodiment of the present invention, a contamination detection apparatus is provided for an electromagnetic radiation measuring device. Again, the electromagnetic radiation measuring device measures an intensity of electromagnetic radiation from a target and has an optically transmitting element for transmitting the electromagnetic radiation from the target. The contamination detection apparatus has a contamination detection (CD) radiation source for providing a source intensity of radiation passing through the optically transmitting element. A modulator is provided for modulating the CD radiation source in order to discriminate between the radiation from the target and the radiation from the CD radiation source. A measurement detector is provided for detecting a final pass intensity of the radiation provided by the CD radiation source after the radiation provided by the CD radiation source has passed through the optically transmitting element. Again, the measurement detector has a measurement output level that is representative of the final pass intensity. A filter is also provided and operates in conjunction with the modulator, for discriminating between the radiation from the target and the radiation from the CD radiation source. As in the previous embodiments, a comparator is provided for comparing the measurement output level with a reference level that represents the amount of radiation from the contamination detection (CD) radiation source, in order to determine the amount of contamination on the optically transmitting element. Again, the contamination detection apparatus is capable of operating simultaneously with measurement of the intensity of the electromagnetic radiation from the target.

Several other features of the above embodiments of the present invention can be summarized as follows. The reference output level mentioned above is used to create an operational threshold level which is correspondingly adjusted in response to changes in the reference output level. In addition, the operational threshold level is used to determine whether the amount of contamination on the optically transmitting element is acceptable. Further, comparing the measurement output level with the reference output level, described above, can include dividing the measurement output level by the reference output level in order to detect the amount of contamination on the optically transmitting element. Alternatively, comparing the measurement output level with the reference output level can include dividing the reference output level by the measurement output level in order to detect the amount of contamination on the optically transmitting element.

A radiation controller can further be provided for controlling the radiation provided by the CD radiation source in response to the reference output level in order to maintain the reference output level at a substantially constant level. In addition, a focusing element can be provided that is capable of focusing radiation, wherein the CD radiation source provides a wide beam of radiation, and wherein the focusing element focuses the radiation to a small spot on the measurement detector in order to detect contamination across substantially the entire optically transmitting element. A sensitivity correction mask can also be provided adjacent to the optically transmitting element for improving uniformity of detection sensitivity across the optically transmitting element by correcting non-uniformity of the radiation passing through the optically transmitting element. Further, a target detector filter can be provided for filtering out portions of the radiation provided by the CD radiation source where the target detector is responsive to radiation, and for causing the target detector to be non-responsive to the radiation provided by the CD radiation source, in order to reduce the effect of the radiation provided by the CD radiation source on the detection of radiation from the target by the target detector.

Additional features and advantages of the present invention include the following:

The present invention can detect a change in transmission of light through the pane of less than 1 percent.

The pane used for the temperature measurement in at least one embodiment above is also the pane used for the testing of contamination. This provides for improved accuracy of contamination detection.

A large fraction of the pane is tested for contamination.

The testing of contamination on the pane is concurrent with the thermometer measurement of the target.

Any variation of the internal light source is accounted for by the reference detector.

The pane can be easily cleaned.

The present invention is not affected by ambient light or radiation from the target.

Other advantages and aspects of the present invention will become apparent upon reading the following description of the drawings and detailed description of the invention.

BRIEF DESCRIPTION OF THE DRAWINGS

FIG. 1 is a side view of an electromagnetic radiation measuring device and an object to be measured.

FIG. 2 is a side view of an electromagnetic radiation measuring device and an object to be measured, while depicting possible environmental impediments to operation.

FIG. 3 is a cut-away partial side view of the electromagnetic energy measuring device of FIG. 1, depicting the contamination detection apparatus of the present invention.

FIG. 4 is a cut-away partial side view of an alternative embodiment of the contamination detection apparatus of FIG. 3.

DETAILED DESCRIPTION

Figure 5:
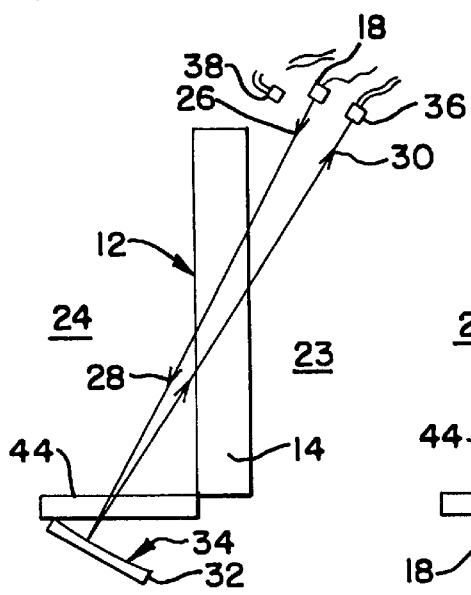
FIG. 5 is a diagram of the embodiment of the contamination detection apparatus from FIG. 4.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

For optical measuring devices whose outputs are based on the absolute quantity of electromagnetic radiation collected by the instrument, contamination of the optics by dirt, mist, dust, or other contaminants can reduce the amount of light detected by the instrument, resulting in measurement error. One example is an infrared thermometer that measures the radiation within a narrow wavelength band coming from a heated material in order to determine the temperature of the material. When the thermometer's optics become contaminated, the thermometer will erroneously indicate that the material has cooled off. Even for instruments whose output is not determined by absolute collected radiation (multi-wavelength thermometers, polarimeters, etc.), contamination of the optical path can reduce the dynamic range and otherwise adversely influence the performance of the instrument.

Before knowing that any corrective action should be taken, i.e., cleaning the optical surfaces, contaminants must be detected. This detection preferably should take place before the instrument's output is severely affected by the contamination. The system described herein is intended to provide such an indication to an infrared thermometer and other instruments, whose exposed optical element is an optically transmitting element 14 such as, for example, a planar window pane 14. Thus, with reference to the Figures, the present invention is a contamination detection apparatus 10 for detecting contamination on an outer optical surface 12 of the pane 14. The Figures depict the present invention within an electromagnetic radiation measuring device 16. One specific example of an electromagnetic radiation measuring device is the invention disclosed in U.S. patent application Ser. No. 08/406,324, to Ignatowicz et al., and assigned to Ircon, Inc. of Niles, Ill. This disclosure is hereby incorporated herein by reference.

FIG. 1 of the present invention shows the electromagnetic radiation measuring device 16 directed at a target 11 to detect the electromagnetic radiation from the target 11 under ideal conditions. However, this Figure does not capture the true environment in which this type of device is used. Therefore, FIG. 2 shows the various environmental elements in which the radiation measuring device 16 is typically used. Specifically, between the measuring device 16 and the target 11 is shown (from left to right) flames, particles and gases, steam, smoke, and solid obstructions. Within this type of environment, contaminants will tend to land or come into contact with the machinery and instruments used within the environment. As mentioned above, these contaminants can significantly affect the operation and accuracy of the measurements and, thus, the outputs from the device 16, when the contaminants land on the outer optical surface 12 of the pane 14. Thus, detection of the contaminants is significant, for signaling that the outer optical surface 12 should be cleaned in order to achieve acceptable output readings from the device 16, and in order to correct the output readings in response to the amount of contamination on the outer optical surface 12, as will be explained in greater detail below, according to the principles of the present invention.

The radiation measuring device 16 shown in FIGS. 1 and 2 is capable of generating a signal representative of the radiation, and the pane 14 therein permits radiation to pass therethrough. However, the present invention can be used in conjunction with other devices, and is not limited to use in conjunction with only radiation measuring devices, such as the invention disclosed in U.S. patent application Ser. No. 08/406,324. The present invention achieves this through the stand-alone nature of the contamination detection apparatus 10, which will also be explained in greater detail below. The present invention is capable of detecting contaminants with a very high sensitivity, and in particular, a decrease in window or viewing pane transmittance of less than 1% can be detected.

As shown in FIG. 3, in one embodiment of present invention, the contamination detection apparatus 10 includes an internal radiation source 18 (or contamination detection (CD) radiation source 18) positioned within the interior of the measuring device. Preferably, the internal radiation source 18 should illuminate the entire pane 14 from outside of the optical instrument on the outer optical surface 12. However, in the embodiment in FIGS. 3, 4, and 5, the internal radiation source 18 covers more than 80% of the usable pane 14 area. Specifically, the measuring device 16 includes a housing 20 which has a recessed interior 22 that is not in the path of the radiation from target 11 to a target detector 27, and an unrecessed interior 23. The contaminants cannot reach the interior 22 of the housing 20. An exterior 24 also exists in relation to the housing 20, which is the area that the contaminants can reach.

Figure 8:
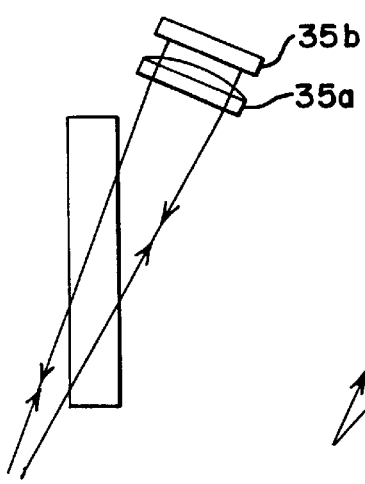
FIG. 8 is a diagram of the present invention depicting one reflector embodiment of the present invention.
Figure 9:
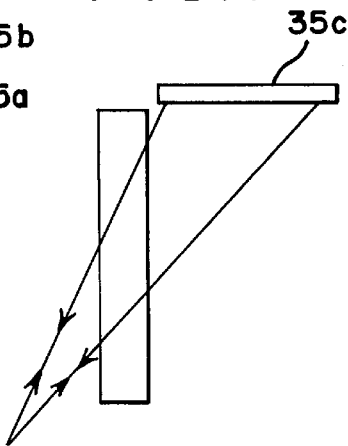
FIG. 9 is a diagram of the present invention depicting an alternative reflector with a holographic optical element embodiment of the embodiment from FIG. 8.
Figure 10:
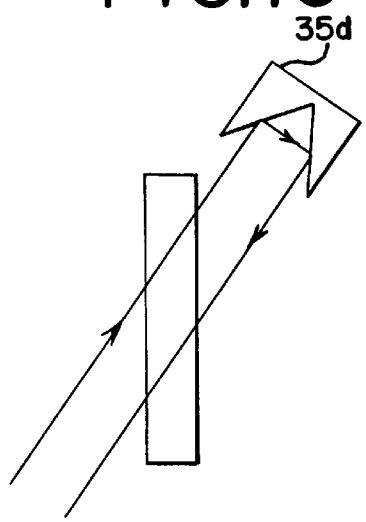
FIG. 10 is a diagram of the present invention depicting an additional alternative reflector embodiment of the embodiment from FIG. 8.

The internal radiation source 18 generates and provides a source intensity 26 of radiation. The source intensity of radiation 26 passes from an exterior 24 of the pane 14 through the pane 14 to the unrecessed interior 23 of the pane 14, thereby creating a first pass intensity 28 of radiation. A focusing element 32, such as a reflector 32 or collecting optic 32 having a reflective surface, is positioned within the recessed interior 22 of the measuring device 16. The focusing element 32 accepts or collects the first pass intensity 28 or light generated by the internal radiation source 18, and reflects the first pass intensity 28 of radiation from the unrecessed interior 23 of the pane 14 (clean side of the pane 14), and is refocused back through the pane 14 to the exterior of the viewing pane 24, thereby creating a second pass intensity 30 of radiation providing twice the sensitivity of a single pass system. The focusing element 32 depicted in FIGS. 3 and 4 is a spherical first-surface mirror. FIGS. 8, 9, and 10 suggest other possible elements for the collection and steering function. In particular, FIG. 8 shows an auto-collimator system which places a lens 35a one focal length away from the internal radiation source 18 such that radiation or light leaving the lens 35a is collimated. A flat mirror 35b placed anywhere beyond the collimating lens 35a reflects the collimated radiation back through the lens 35a, which re-focuses the radiation to a measurement detector 36, as will be explained further below. FIG. 9 shows a holographic optical element (HOE) 35c, which can also be used as the focusing element 32, in conjunction with the internal radiation source 18 that has a sufficiently narrow wavelength spectrum. This arrangement offers, at least, the advantages of being able to orient the HOE element 35c parallel with the optical axis of the pane 14, and of low-cost replication fabrication. Although a reflective HOE 35c is shown, one could also use a transmission HOE in conjunction with a flat mirror in an auto-collimator arrangement. One additional possible embodiment is shown in FIG. 10. This embodiment includes a retroreflecting element or retroreflector 35d, which could be used for a probing beam that is nearly collimated and doesn't require focusing.

As briefly mentioned above, a measurement detector 36 is provided within the present invention and is positioned within the recessed interior 22 of the measuring device 16. The measurement detector 36 receives the second pass or final pass intensity 30 of radiation that is refocussed back through the pane 14 by the focusing element 32, and the measurement detector 36 detects the final pass intensity 30. The embodiment of the present invention shown in FIGS. 3, 4, and 5 can be named a "double-pass" contamination detection apparatus, since the radiation generated by the internal radiation source 18 passes through the pane 14 twice before being detected by the measurement detector 36.

A reference detector 38 is positioned adjacent or near the internal radiation source 18, and within the recessed interior 22, for detecting the source intensity of radiation generated by the internal radiation source 18. The source intensity 26 of radiation is the absolute output energy per unit area of the source, and is independent of any contamination on the pane 14. In essence, the output from the reference detector 38 is used as a normalizing value for the output of the measurement detector 36, i.e. a ratio scheme is employed. The contamination detection apparatus 10 output is, thus, insensitive to fluctuations in the absolute output energy of the internal radiation source 18. Specifically, the measurement detector 36 and the reference detector 38 are both connected to a processor 40. The processor 40 is provided for comparing the source intensity of radiation to the final pass intensity of radiation in order to detect the amount of contamination exists on the outer optical surface 12 of the pane 14. The reference detector 38 is also for providing the source intensity 26 of radiation to the processor 40 for use in comparing the source intensity 26 to the final pass intensity of radiation in order to detect the amount of contamination on the outer optical surface 12 of the pane 14 within the measuring device 16. Thus, the processor 40 determines the proportional amount of signal loss due to the contamination on the outer optical surface 12. The processor 40 can then calculate the amount of correction required to correct the radiation output signal a proportional amount in response to the processor 40 determining the proportional amount of signal loss due to the contamination on the outer optical surface 12. Thus, cleaning a small amount of contamination on the outer optical surface 12 may not always be necessary due to the ability of the present invention to correct the output signal of the device in response to the amount of detected contamination. However, cleaning the outer optical surface 12 may be preferred in order to insure accuracy.

In the embodiment shown in FIG. 3, a mirror 42 is positioned within the recessed interior 22 of the measuring device 16 for accepting the source intensity 26 generated by the internal radiation source 18, and for reflecting the source intensity 26 from the exterior 24 of the pane 14 through the pane 14 to the unrecessed interior 23 of the pane 14 towards the focusing element 32. In both the embodiments shown in FIGS. 3 and 4, a window 44 is positioned between the internal radiation source 18 and the pane 14, within a path of the source intensity 26, for preventing contaminants from entering the recessed interior 22 of the measuring device 16, where the measurement and reference detectors 36, 38 are positioned. This window 44 is significant in, at least, two aspects. First, the window 44 adds an extra exposed surface. Therefore, the window 44 size and location must allow convenient cleaning along with the outer optical surface 12 of the pane 14. Second, because the window 44 is exposed, the window 44 will increase the sensitivity of measuring for contaminants that are spread over the entire exposed area of the instrument, including both the outer optical surface 12 and the window 44. In effect, the system becomes a "four-pass" probe, because the path of the radiation coming from the internal radiation source 18 will pass twice through the window 44 and twice through the pane 14 before the first measurement detector 36 detects the strength of the remaining signal. This would be undesirable if there is a high likelihood of contaminants reaching the window 44, but not the viewing pane, although unlikely due to the two being adjacent one another, as shown in the figures.

The mirror 42 allows the active elements (the measurement and reference detectors 36, 38 and the internal radiation source 18) to more easily be placed on the clean side of the window 44, and at least, allows for reduction in the size of the radiation measuring device 16 cross-section. Because the mirror 42, which can be a folding mirror, would otherwise be located on the exposed side of the pane 14, it is desirable to protect this mirror 42 with the window 44. The above configuration of the detection apparatus 10 detects contamination on the outer optical surface 12 of the pane 14 across substantially the full outer optical surface 12.

A variable driver can also provide for varying the source intensity 26 of radiation of the internal radiation source 18. Over time, the intensity of the radiation given off by the internal radiation source 18 can vary. Thus, the source intensity 26 of radiation given off by the internal radiation source 18 is varied in response to the amount of radiation detected by the reference detector 38, with the change in the source intensity 26 being determined by the processor 40. The varying of the source intensity 26 is performed in order to maintain the source intensity 26 of radiation at a substantially constant intensity. It should be understood that keeping the source intensity 26 of radiation at a substantially constant intensity will allow for a more accurate determination of the amount of contamination on the outer optical surface 12 of the pane 14.

A frequency driver 46 can be provided for driving the internal radiation source 18 in a substantially fixed frequency range. A filter 48 can also be provided for filtering out portions of the source, first pass, and/or second (final) pass intensities 26, 28, 30 of radiation, respectively. The filter 48 filters out the portions which are outside of the substantially fixed frequency range obtained with the use of the frequency driver 46. This driving and filtering is performed for removing ambient radiation, and for providing a more accurate determination of the amount of contamination that exists on the outer optical surface 12 of the pane 14.

Instead of providing a driver 46 to drive the internal radiation source 18 in a particular frequency or wavelength range, the internal radiation source 18 can be chosen with characteristics that fall within acceptable ranges for frequency and/or wavelength. Thus, the internal radiation source 18 chosen will generate radiation within a first wavelength range. A filter 48 can then be used to filter radiation outside of this first wavelength range, for removing most ambient radiation. The radiation detector 27 will then be detecting radiation within the first wavelength range, as one of ordinary skill in the art would appreciate and understand.

Figure 11:
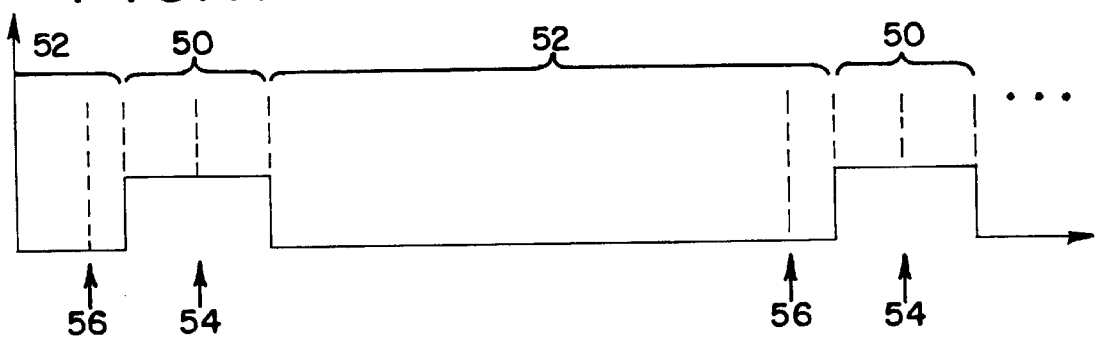
FIG. 11 is a graph of the source intensity of radiation as a function of time.

The driver 46 can be pulsed in order to pulse the internal radiation source 18. This pulsing can be performed to achieve a more accurate determination of contamination on the pane 14. Specifically, FIG. 11 shows a graph with the x-axis as time, and the y-axis as the amount of radiation emitted by the internal radiation source 18. The internal radiation source 18 is pulsed for a first time interval 50, and then not pulsed for a second time interval 52. An "unpulsed" measurement 56 is taken at approximately the time designated as "56" in FIG. 11, during the second time interval 52. During the second time interval 52, the output of the measurement and reference detectors 36, 38 represents whatever background light has reached the detector, along with any electrical offset. The output signals from the measurement and reference detectors 36, 38 are sampled and stored. At the beginning of the first time interval 50, the internal radiation source 18 is turned on. During the excitation of the internal radiation source 18, a "pulsed" measurement 54 is taken at approximately the time designated as "54" in FIG. 11, with both the measurement and reference detectors 36, 38 during this first time interval 50. The output from these detectors 36, 38 are sampled and stored. The processor 40 compares the pulsed measurement 54 to the unpulsed measurement 56, taken by the measurement and reference detectors 36, 38 in order to detect the amount of contamination, if any on the outer optical surface 12 of the pane 14. More specifically, the stored values from unpulsed measurement 56 is subtracted from the stored values from pulsed measurement 54, effectively canceling out the influence of any signals present at both of these times ("54" and "56"). These background-corrected values are then used in the ratio calculation of pane 14 and/or window 44 transmittance. At a later time, the entire sequence is repeated, as is generally shown in FIG. 11.

The time elapsed between the unpulsed measurement 56 and the pulsed measurement 54 is preferably made to be as short as possible (or as necessary) so that typical background signals (fluctuating room light, heating and cooling targets, electrical offsets, etc.) do not appreciably change their values over this time span. The time between cycles needs to be short enough to obtain the desired contamination monitoring rate, but should be long compared to the time that the internal radiation source 18 (IRED) is energized (first time interval 50) to lengthen the lifetime of the internal radiation source 18. Other types of periodic operation could be employed as well. The storage, acquisition, and ratio calculation of the signals can be performed by a variety of analog or digital electronic methods, as well as the processing of other signals and information. The preferred method is the use of a microprocessor to perform the analog-todigital conversions, ratio calculation, timing functions, and other functions. The processor 40 can be a hard wired circuit, a programmed microcontroller, or other equivalent electronic device, as would be understood by one of ordinary skill in the art.

For, at least, the pulsed embodiments of the present invention, the internal radiation source 18 is an infrared emitting diode (IRED). The IRED preferably can be either GaAs (940 nm) or GaAlAs (880 nm) because of the following: The source wavelength should be as near to the operating wavelength of the overall radiation measuring device 16 as is practical. Contaminants can have different effects upon instruments operating at different wavelengths. In addition, the preferred detector material is silicon, which is very stable and most sensitive to this region of the wavelength spectrum. Stability of the detector is significant in achieving accuracy of the measurement of the amount of contamination. Specifically, the preferred detector should be stable to within 1/10th of 1 percent error. Inexpensive detectors may be obtained having built-in filters that block visible light. This reduces interference from ambient lighting found in factories and laboratories. IREDs are relatively inexpensive, readily available in a variety of physical configurations, and are capable of producing intense output beams.

For the pulsed embodiment or mode of the present invention, with proper attention given to component location, along with the use of visible-blocking detector filters (spectral filters), the interference from external light sources (including a glowing target) can be greatly diminished, as mentioned above. Nevertheless, even very small amounts of background light should be avoided to achieve maximum sensitivity and linearity. Also, the lifetime of an IRED will be shortened by exciting it continuously with large currents, especially in environments where the ambient temperature is elevated. It is, thus, advantageous to operate the internal radiation source 18 in a pulsed mode, i.e., excite the internal radiation source 18 periodically with a large current for a very brief time.

Figure 6:
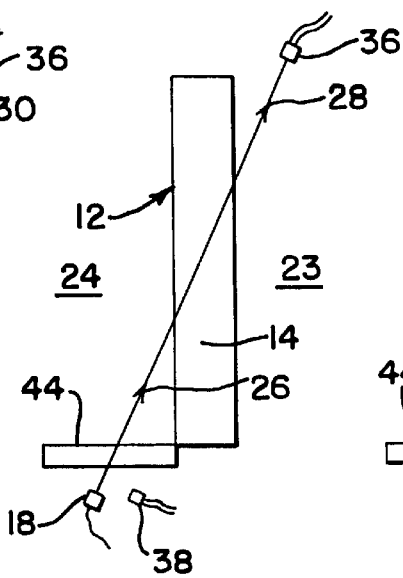
FIG. 6 is a diagram of an alternative embodiment of the contamination detection apparatus from FIG. 4.
Figure 7:
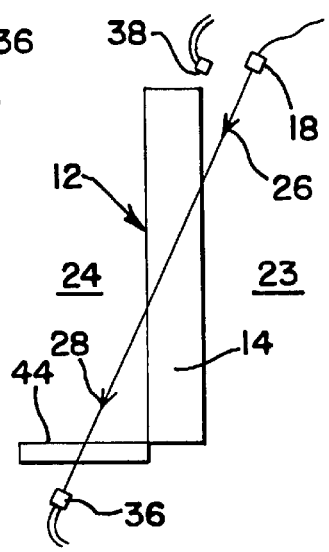
FIG. 7 is a diagram of a further alternative embodiment of the contamination detection apparatus from FIG. 4.

Referring also to FIG. 5, in a further embodiment of the present invention, the source intensity 26 of radiation passes from the unrecessed interior 23 of the pane 14 through the pane 14 to the exterior 24 of the viewing pane, thereby creating a first pass intensity 28 of radiation. The focusing element 32 accepts the first pass intensity 28 of radiation, and reflects the first pass intensity 28 from the exterior 24 of the pane 14 through the pane 14 to the unrecessed interior 23 of the pane 14. A second pass intensity 30 of radiation is thereby created. For the present embodiment, the second pass intensity 30 is the final pass intensity 30. Thus, the focusing element 32 can also be positioned on the exterior of the measuring device 16, and contamination thereon will detected in the same manner as contamination on the outer optical surface 12 of the pane 14, as described above. However, in a similar arrangement as the window 44 between the mirror 42 and the pane 14 in FIG. 3, a window 44 can be positioned between the pane 14 and the focusing element 32 within a path of the first pass intensity 28, as shown in FIG. 5, for preventing contaminants from reaching the focusing element 32. In the embodiment diagrammatically shown in FIGS. 6 and 7, the processor 40 compares the source intensity 26 of radiation to the first pass intensity 28 of radiation (final pass radiation for these embodiments) in order to detect the amount of contamination that exists on the outer optical surface 12 of the pane 14 within the measuring device 16. Likewise, the processor 40 is provided for determining the proportional amount of signal loss due to the contamination on the outer optical surface 12. In response thereto, the processor 40 can then calculate the amount of correction required to correct the radiation output signal a proportional amount in response to the processor 40 determining the proportional amount of signal loss due to the contamination on the outer optical surface 12. Reference to the embodiments from the other figures, along with reference to the detailed description thereof, should be made for an understanding of the remaining features of the embodiment from FIGS. 5, 6, and 7 of the present invention.

For a better understanding of the present invention, the invention will be described as follows. The radiation measuring device 16 is capable of generating a radiation output signal that is representative of radiation from a target 11. The device 16 has an target measurement path which includes a optically transmitting element 14, such as a pane 14, having an outer optical surface 12. The path and pane 14 define an exterior target radiation chamber 24 and an interior target radiation chamber 23. The device 16 also has a first peripheral chamber 22a or 22b and a second peripheral chamber 22b or 22a (depending on how the first peripheral chamber is defined), both substantially peripheral to the target measurement path. The first peripheral chamber 22a or 22b is substantially traverse or across, but can be shifted, from the second peripheral chamber 22b or 22a across the target measurement path. The contamination detection apparatus 10 is for detecting contamination on the outer optical surface 12 and the contamination detection apparatus includes an internal radiation source 18 positioned within the first peripheral chamber 22a or 22b for generating a source intensity 26 of radiation. The source intensity 26 passes from the first peripheral chamber 22a or 22b through the pane 14 to the second peripheral chamber 22b or 22a thereby creating a first pass intensity of radiation. The apparatus 10 further includes a measurement detector 36 positioned within the second peripheral chamber 22b or 22a for receiving the first pass intensity of radiation, and for detecting the first (final) pass intensity of radiation in order to determine the amount of contamination that exists on the outer optical surface 12 of the pane 14.

As an alternative, a focusing element 32 can be positioned within the second peripheral chamber 22b or 22a for accepting the first pass intensity of radiation, and for reflecting the first pass intensity of radiation from the second peripheral chamber 22b or 22a back through the pane 14 to the first peripheral chamber 22a or 22b, thereby creating a second pass intensity of radiation. The measurement detector will then be positioned within the first peripheral chamber 22a or 22b for receiving the second (final) pass intensity of radiation, in order to determine the amount of contamination that exists on the outer optical surface 12 of the viewing pane 14.

Figure 12:
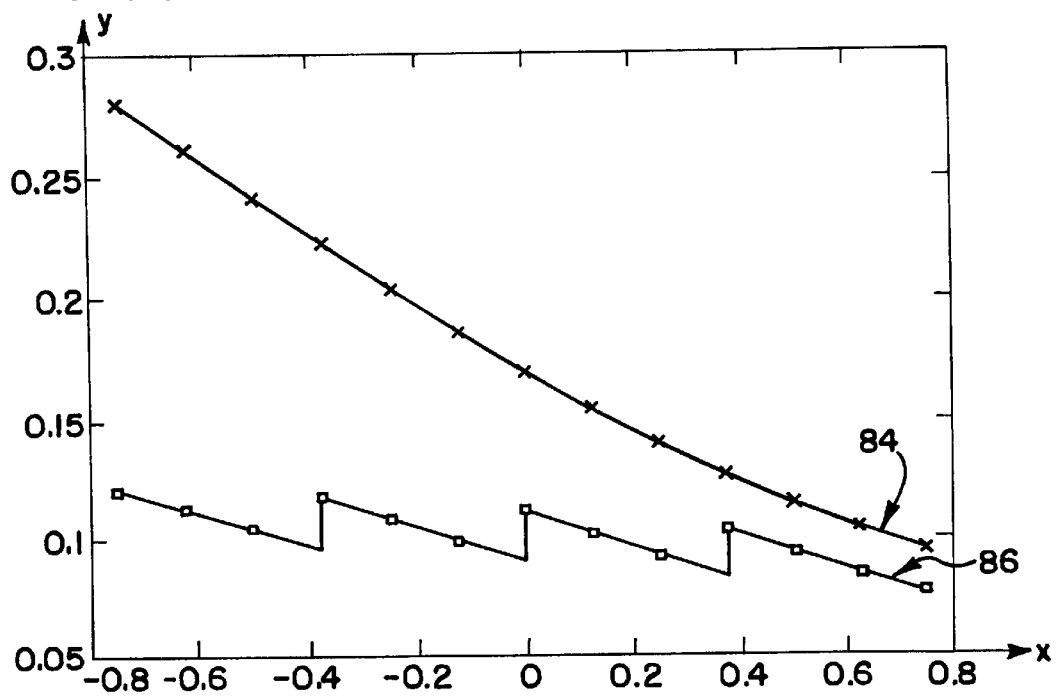
FIG. 12 is a graph of a sensitivity profile of a sensitivity correction apparatus of the present invention.
Figure 13:
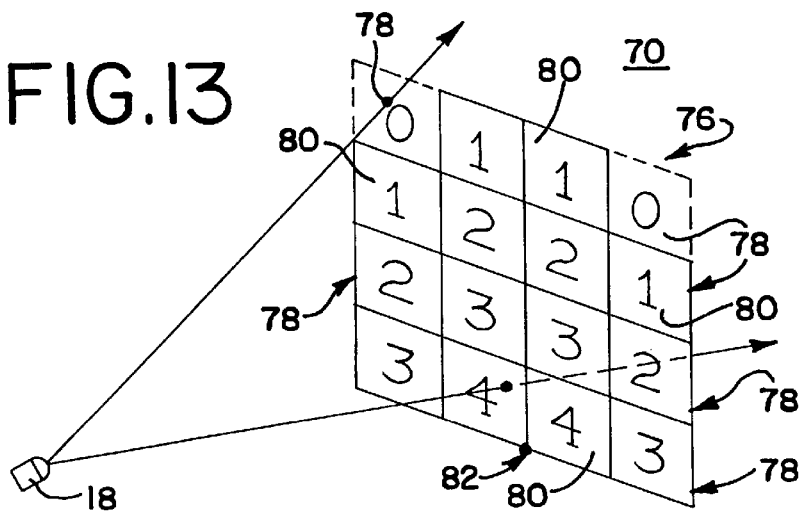
FIG. 13 is a diagram of a correction mask depicting electromagnetic radiation passing therethrough.

Referring also to FIGS. 12 and 13, the present invention also includes a sensitivity correction apparatus 70. The sensitivity correction apparatus 70 can be used in conjunction with the electromagnetic radiation measuring device 16. In addition, the sensitivity correction apparatus 70 can be used in conjunction with other measuring devices, as would be understood by one of ordinary skill in the art.

In the event of highly localized contamination (i.e.—a very small contamination spot), it is desirable that the measurement detector 36 not be more sensitive to one region of the pane 14 than another region. Without taking steps to avoid this, however, the measurement detector 36 will surely be "biased" towards the closest point on the pane 14. The reason for the bias is that there is more radiation per area passing through the pane 14 region nearest the internal radiation source 18 than in a region of equal area away from the internal radiation source 18. This reasoning is based the following: The radiation per area of a beam of radiation from an infrared emitter decreases with increasing distance from the emitter. In addition, the radiation or light impinges upon the pane 14 at more of a glancing angle at the farther points of the pane 14, while at the closer points on the pane 14, the light hits the pane 14 more head-on. The amount of radiation that reflects from the outer optical surface 12 increases at more glancing incident angles, and is therefore not transmitted. Because there are two air-glass interfaces at the pane 14, and the beam is passed through the pane 14 twice, this phenomenon occurs four times for the viewing pane based on the double-pass arrangement. Furthermore, there are inherent non-uniformities in an IRED or LED (internal radiation source 18) beam, depending on the spread angle, distance away from the internal radiation source 18, and physical construction of the internal radiation source 18. These are usually symmetric about the mechanical axis of the internal radiation source 18. Thus, there are, at least, three reasons for the need of sensitivity correction: 1) the beam of light or radiation from the LED (internal source 18) is not uniform, 2) the angle at which the light or radiation hits the pane 14 causes a variation in the intensity because the light intensity decreases with distance, and 3) the transmission through the pane 14 varies with the angle of transmission.

There are several ways to reduce these effects. One approach is to first determine the intensity profile across the usable pane 14 area, and then to construct an optical element whose transmittance varies across its surface such that, when placed into the optical path, it strongly reduces the amount of light that reaches the more sensitive pane 14 regions, while only weakly reducing the light/radiation that reaches the insensitive pane 14 regions. In other words, construct a correction mask that "undoes" the non-uniformity caused by all other factors.

Within the electromagnetic radiation measuring device 16 shown in FIG. 4, the internal radiation source 18 creates a path of radiation 26 having a varying intensity across the outer optical surface 12 of the pane 14. Specifically, the radiation path 26 in FIG. 4 is shown with two rays which intersect the outer optical surface 12 at a first intersection point 72 and a second intersection point 74. The distance between the internal radiation source 18 and the first intersection point 72 (distance A) is less than the distance between the internal radiation source 18 and the second intersection point 74 (distance B). Thus, the intensity of the radiation from the internal radiation source 18 at the first intersection point 72 is less than the intensity of the radiation from the internal radiation source 18 at the second intersection point 74. The sensitivity correction apparatus 70 is provided to correct for this varying intensity, and for creating approximately equal sensitivity to across the pane 14 and/or window 44. As shown in FIG. 13, the sensitivity correction apparatus 70 includes a correction mask 76 having a plurality of strip spaces 78 and a plurality of transmittance strips 80. Layers of transmittance strips 80 are placed in the strip spaces 78 according to the distance between the internal radiation source 18 and each strip space 78 in order to reduce the intensity of the beam for each strip 80 when the beam passes through the strips within the mask 76. The strips 80 can be made of an optical material that transmits 90% of the radiation that reaches one surface thereof and passes through the opposite surface. For the near-infrared radiation discussed herein, a good choice might be very thin sheets of a polycarbonate material.

Within FIG. 13, the internal radiation source 18 is positioned along an axis extending from a first reference point 82 perpendicular to the plane of the correction mask 76. Thus, the correction mask 76 shown in FIG. 13 has four (4) strips 80, or four (4) layers of strips 80, placed within each strip space 78 for the strip spaces 78 that are closest in distance to the internal radiation source 18. Likewise, the correction mask 76 shown in FIG. 13 has zero (0) strips 80, or zero (0) layers of strips 80, placed within each strip space 78 for the strip spaces 78 that are farthest in distance from the internal radiation source 18. The number of strips 80 within the other strip spaces in FIG. 13 corresponds to the relative distance between those strip spaces 78 and the internal radiation source 18, as can be understood with reference to this Figure. Each of the transmittance strips 80 reduce the intensity of a beam of radiation when the beam passes therethrough.

With reference to FIG. 12, without the use of the correction mask 76, an uncorrected profile 84 is created with sensitivity variation being measured along the y-axis and the position across the pane 14 being measured along the x-axis. Without corrective action (marked by x's), the figure suggests that there may be a 4 to 1 difference in the sensitivity of the system to equal contamination of the two extreme pane 14 regions for the specific setup mentioned below. The intensity profile is shown along an asymmetric direction (vertically along the viewing pane in FIGS. 3 and 4, in the plane of the optic axis of the system) of a 1.5 inch diameter viewing pane. The beam spread variation is modeled from actual data taken of an IRED internal radiation source 18 beam profile. The reflection loss is calculated assuming two passes through a pane 14 material of Calcium Fluoride. The plot takes both effects into account. FIG. 12 also shows a corrected profile 86 which shows the sensitivity variation with respect to distance from the internal radiation source 18, only with the use of the correction mask 76. As shown in FIG. 12, the corrected profile 86 shows that the sensitivity variation is significantly reduced for the strip spaces 78 which are further away from the internal radiation source 18. Thus, by incrementally increasing the number of strips 80 for strip spaces that transmit more light, the corrected profile 86 for sensitivity variation is substantially leveled off. The effect of the use of the correction mask 76 for the radiation measuring device 16 is that contamination on the outer optical surface 12 at any point on the pane 14 can be detected with substantially the same sensitivity as at any other point on the surface 12. The correction mask, therefore, allows for significantly improved detection of the contamination on the outer optical surface 12.

In addition, when the correction mask 76 is used in conjunction with the radiation measuring device 16, since the beams of radiation pass through the pane 14 more than once, the beams of radiation will also pass through the correction mask 76 and the strips 80 more than once. The passing of the beams of radiation more than once will increase the intensity reduction of the beam from the strips 80. Likewise, the beams of radiation passing through the strips 80 more than twice will further increase the intensity reduction of the beams.

The correction mask 76 does not have to be positioned, however, at the outer optical surface 12. In fact, the location of this mask 76 that makes its fabrication easiest is at the reflective surface 34 of the focusing element 32. The reflective surface 34 is where the beam is largest and is the point where the incoming and outgoing beams are not displaced from one another.

Another embodiment of the present invention can include a correction mask 76 which has a continuously varying thickness, instead of the use of strips, which each have a substantially constant thickness. In essence, as the number of strip spaces 78 increase for the same area (smaller strip spaces 78), the closer the thickness of the correction mask 76 gets to a continuously varying thickness. Thus, similar to the use of strips 80 and strip spaces 78, the thickness of each point on this further embodiment of the correction mask 76 is determined according to the distance between the internal radiation source 18 and each point on the mask, in order to reduce the intensity of the beam for that point when the beam passes through the correction mask 76. As can be understood with reference to FIG. 12, the corrected profile 86 will look closer to a horizontal line with the use of a continuously varying thickness for the correction mask 76. Theoretically, an optical element can be fabricated having a continuously variable transmittance that could make the intensity profile a perfectly flat line. However, this is an expensive proposition, and could not be perfectly implemented on every manufactured system, due to normal variations in manufacturing, and due to the experimental nature of the correction mask creation. Thus, the inexpensive and easily varied alternative is to approximate the perfect transmittance profile of the ideal correction mask with a piecewise mask consisting of multiple steps of transmittance, such as the strip 80 and strip space 78 embodiment described above, an to test and vary the mask until commercially acceptable. In either embodiment, the presence of contamination is detectable to the degree that a 1% change in the transmittance of the contaminable surface or viewing pane is detectable.

It should be understood that a varying thickness of the mask 76 is not required for the practice of the present invention. Specifically, in the system for correcting the level of radiation from the internal radiation source 18 reaching the measurement detector 36 in order to account for unequal transmission of radiation through a pane 14 between the internal radiation source 18 and the measurement detector 36, the system can include a correction mask 76 having a varying radiation reduction gradient. The mask 76 reduces the intensity of the radiation when the radiation passes therethrough, and the radiation reduction gradient of each point on the mask 76 can be determined according to the amount of transmission at each point on the mask to reduce the intensity of the radiation for that point when the radiation passes through the mask 76. The mask 76 can, thus, be substantially the same thickness across the width and length thereof, and the composition of the material used for the mask material can be varied, thereby creating an increasing reduction in radiation or radiation reduction gradient for radiation passing through the pane 14 when moving across the mask, while starting at the point of least reduction.

An arithmetic division operation is performed by the processor 40 on the signals. Specifically, the numerator of the division operation is the output signal of the measurement detector 36 which collects the radiation passing through the pane 14. The denominator of the division operation is the output signal of the reference detector 38 which collects a portion of the direct radiation from the internal radiation source 18. A light barrier 29 can also be located between the internal radiation source 18 and the measurement detector 36 intended to collect radiation passing through the pane 14.

In an even further embodiment of the present invention, the measurement detector 36' also functions as a target detector 27 for detecting the amount of radiation being given off by the target 11. Within this embodiment, a separate measurement detector from the target detector 27 is not necessary, as can be understood from the above description.

While the specific embodiments have been illustrated and described, numerous modifications come to mind without significantly departing from the spirit of the invention and the scope of protection is only limited by the scope of the accompanying claims.

What is claimed is:

1. A contamination detection apparatus for measuring an amount of contamination on an optically transmitting element which transmits electromagnetic radiation therethrough, the contamination detection apparatus comprising:

a contamination detection (CD) radiation source for providing a source intensity of radiation passing through the optically transmitting element at least once;

a reference detector for detecting the source intensity of radiation, the reference detector having a reference output level that is representative of the source intensity;

a measurement detector for detecting a final pass intensity of the radiation provided by the CD radiation source after the radiation provided by the CD radiation source has passed through the optically transmitting element, the measurement detector having a measurement output level that is representative of the final pass intensity; and, means for comparing the measurement output level with the reference output level in order to detect the amount of contamination on the optically transmitting element.

2. The contamination detection apparatus of claim 1 wherein the contamination detection apparatus is provided for an electromagnetic radiation measuring device, the electromagnetic radiation measuring device measuring the intensity of electromagnetic radiation from a target, and wherein the optically transmitting element transmits the electromagnetic radiation from the target.

3. The contamination detection apparatus of claim 2 wherein the measurement detector is a target detector for detecting the electromagnetic radiation from the target.

4. The contamination detection apparatus of claims 1, 2, or 3 wherein the reference output level is used to create an operational threshold level which is correspondingly adjusted in response to changes in the reference output level, the operational threshold level being used to determine whether the amount of contamination on the optically transmitting element is acceptable.

5. The contamination detection apparatus of claims 1, 2, or 3 wherein comparing the measurement output level with the reference output level includes dividing the measurement output level by the reference output level in order to detect the amount of contamination on the optically transmitting element.

6. The contamination detection apparatus of claims 1, 2, or 3 wherein comparing the measurement output level with the reference output level includes dividing the reference output level by the measurement output level in order to detect the amount of contamination on the optically transmitting element.

7. The contamination detection apparatus of claims 1, 2, or 3 further comprising:

a radiation controller for controlling the radiation provided by the CD radiation source in response to the reference output level in order to maintain the reference output level at a substantially constant level.

8. The contamination detection apparatus of claims 1, 2, or 3 further comprising:

means for modulating the CD radiation source in order to discriminate between any ambient or other radiation passing through the optically transmitting element and the radiation from the CD radiation source.

9. The contamination detection apparatus of claims 1, 2, or 3 further comprising:

a focusing element that is capable of focusing radiation, wherein the CD radiation source provides a wide beam of radiation, and wherein the focusing element focuses the radiation to a small spot on the measurement detector in order to detect contamination across substantially the entire optically transmitting element.

10. The contamination detection apparatus of claims 1, 2, or 3 further comprising:

a sensitivity correction mask adjacent to the optically transmitting element for improving uniformity of detection sensitivity across the optically transmitting element by correcting non-uniformity of the radiation passing through the optically transmitting element.

11. The contamination detection apparatus of claim 3, further comprising:

a target detector filter for filtering out portions of the radiation provided by the CD radiation source where the target detector is responsive to radiation, and for causing the target detector to be non-responsive to the radiation provided by the CD radiation source, in order to reduce the effect of the radiation provided by the CD radiation source on the detection of radiation from the target by the target detector.

12. A contamination detection apparatus for an electromagnetic radiation measuring device, the electromagnetic radiation measuring device measuring the intensity of electromagnetic radiation from a target, having an optically transmitting element for transmitting the electromagnetic radiation from the target, and having a target detector for detecting the electromagnetic radiation from the target, the target detector having a target output level that is representative of an intensity of the electromagnetic radiation from the target, the contamination detection apparatus comprising:

a contamination detection (CD) radiation source for providing a source intensity of radiation passing through the optically transmitting element at least once;

a measurement detector for detecting a final pass intensity of the radiation provided by the CD radiation source after the radiation provided by the CD radiation source has passed through the optically transmitting element, the measurement detector having a measurement output level that is representative of the final pass intensity;

a baffle for preventing radiation provided by the CD radiation source from affecting the target detector; and, means for comparing the measurement output level with a reference level that represents the amount of radiation from the contamination detection (CD) radiation source, in order to determine an amount of contamination on the optically transmitting element, wherein the contamination detection apparatus is capable of operating simultaneously with the measurement of the intensity of the electromagnetic radiation from the target.

13. The contamination detection apparatus of claim 12 wherein an operational threshold level is provided for determining whether the amount of contamination on the optically transmitting element is acceptable, the operational threshold level being adjusted in response to known changes in the reference level.

14. The contamination detection apparatus of claim 12 wherein comparing the measurement output level with the reference level includes dividing the measurement output level by the reference level in order to detect the amount of contamination on the optically transmitting element.

15. The contamination detection apparatus of claim 12 wherein comparing the measurement output level with the reference level includes dividing the reference level by the measurement output level in order to detect if the amount of contamination on the optically transmitting element.

16. The contamination detection apparatus of claim 12 further comprising:

a radiation controller for controlling the radiation provided by the CD radiation source in order to maintain the radiation provided by the CD radiation source substantially constant.

17. The contamination detection apparatus of claim 12 further comprising:

a focusing element that is capable of focusing radiation, wherein the CD radiation source provides a wide beam of radiation, and wherein the focusing element focuses the radiation to a small spot on the measurement detector in order to detect contamination across substantially the entire optically transmitting element.

18. The contamination detection apparatus of claim 12 further comprising:

a sensitivity correction mask adjacent to the optically transmitting element for providing uniform detection sensitivity across the optically transmitting element by correcting non-uniformity of the radiation passing through the optically transmitting element.

19. The contamination detection apparatus of claim 12, further comprising:

a target detector filter for filtering out portions of the radiation provided by the CD radiation source where the target detector is responsive to radiation, for causing the target detector to be non-responsive to the radiation provided by the CD radiation source, in order to reduce the effect of the radiation provided by the CD radiation source on the detection of radiation from the target by the target detector.

20. The contamination detection apparatus of claim 12, further comprising:

a reference detector for detecting the radiation provided by the CD radiation source, the reference level being provided by the reference detector, wherein an operational threshold level is adjusted in response to changes in the reference level.

21. A contamination detection apparatus for an electromagnetic radiation measuring device, the electromagnetic radiation measuring device measuring an intensity of electromagnetic radiation from a target and having an optically transmitting element for transmitting the electromagnetic radiation from the target, the contamination detection apparatus comprising:

a contamination detection (CD) radiation source for providing a source intensity of radiation passing through the optically transmitting element at least once;

means for modulating the CD radiation source in order to discriminate between the radiation from the target and the radiation from the CD radiation source;

a measurement detector for detecting a final pass intensity of the radiation provided by the CD radiation source after the radiation provided by the CD radiation source has passed through the optically transmitting element, the measurement detector having a measurement output level that is representative of the final pass intensity;

a filter portion operating in conjunction with the modulating means, for discriminating between the radiation from the target and the radiation from the CD radiation source; and, means for comparing the measurement output level with a reference level that represents the amount of radiation from the contamination detection (CD) radiation source, in order to determine the amount of contamination on the optically transmitting element, wherein the contamination detection apparatus is capable of operating simultaneously with measurement of the intensity of the electromagnetic radiation from the target.

22. The contamination detection apparatus of claim 21 wherein the measurement detector is also used as a target detector for detecting the electromagnetic radiation from the target, the target detector having a target output level that is representative of the intensity of the electromagnetic radiation from the target.

23. The contamination detection apparatus of claims 21 or 22 wherein the comparison means includes an operational threshold level which is correspondingly adjusted in response to known changes in the reference level.

24. The contamination detection apparatus of claims 21 or 22 wherein comparing the measurement output level with the reference level includes dividing the measurement output level by the reference level in order to detect the amount of contamination on the optically transmitting element.

25. The contamination detection apparatus of claims 21 or 22 wherein comparing the measurement output level with the reference level includes dividing the reference level by the measurement output level in order to detect if the amount of contamination on the optically transmitting element.

26. The contamination detection apparatus of claims 21 or 22 further comprising:

a radiation controller for controlling the radiation provided by the CD radiation source in order to maintain the radiation provided by the CD radiation source substantially constant.

27. The contamination detection apparatus of claim 22 further comprising:

a target filter for filtering out portions of a target signal that represent the target output level, the target filter filtering out portions of the target signal that are related to the radiation provided by the CD radiation source.

28. The contamination detection apparatus of claims 21 or 22 further comprising:

a focusing element that is capable of focusing radiation, wherein the CD radiation source provides a wide beam of radiation, and wherein the focusing element focuses the radiation to a small spot on the measurement detector in order to detect contamination across substantially the entire optically transmitting element.

29. The contamination detection apparatus of claims 21 or 22 further comprising:

a sensitivity correction mask adjacent to the optically transmitting element for providing uniform detection sensitivity across the optically transmitting element by correcting non-uniformity of the radiation passing through the optically transmitting element.

30. The contamination detection apparatus of claim 22, further comprising:

a source filter for filtering out portions of the radiation provided by the CD radiation source where the target detector is responsive to radiation, wherein the target detector is non-responsive to the radiation provided by the CD radiation source, in order to reduce the effect of the radiation provided by the CD radiation source on the detection of radiation from the target by the target detector.

31. The contamination detection apparatus of claims 21 or 22, further comprising:

a reference detector for detecting the radiation provided by the CD radiation source, wherein the comparison means includes an operational threshold level which is correspondingly adjusted in response to changes in the reference level.

\* \* \* \* \*